April 2, 1968     L. S. FINK     3,375,690

METHOD AND APPARATUS FOR MAKING SPIRAL FLUTED TUBING

Filed Feb. 12, 1965

INVENTOR.
LESTER S. FINK

BY *W. B. Harpman*

ATTORNEY

United States Patent Office 3,375,690
Patented Apr. 2, 1968

3,375,690
METHOD AND APPARATUS FOR MAKING SPIRAL FLUTED TUBING
Lester S. Fink, Youngstown, Ohio, assignor to General Extrusions, Inc., Youngstown, Ohio, a corporation of Ohio
Filed Feb. 12, 1965, Ser. No. 432,128
3 Claims. (Cl. 72—64)

ABSTRACT OF THE DISCLOSURE

A method and apparatus for simultaneously extruding and forming a longitudinally extending spiral fluted shape using an extrusion die and means twisting the leading end of said extruded shape as it is extruded.

---

This invention relates to fluted tubing particularly as produced on an extrusion press and more particularly to a method and apparatus for making spiral fluted tubing.

The principal object of the invention is the provision of a method of producing spiral fluted tubing being extruded from an extrusion press.

A further object of the invention is the provision of apparatus for engaging fluted tubing being produced by an extrusion press and imparting a spiral twist thereto.

A still further object of the invention is the provision of a simple and inexpensive apparatus for grasping the end of an extruded fluted tube and moving it away from its point of extrusion and simultaneously imparting a twist thereto, so as to create a spiral pattern in the flutes formed in the extruded tubing.

A still further object of the invention is the provision of apparatus for engaging and guiding a tube being extruded so as to move it along a runout table and incorporating means for conveniently rotating the tubing on its longitudinal axis so as to impart an ornamental spiral to longitudinally extending surface configurations as extruded on the tubing.

The method and apparatus for making spiral fluted tubing as disclosed herein comprises an improvement in the art of extruding metal tubing, such as aluminum, wherein the extrusion die is so shaped as to form a plurality of longitudinally extending circumferentially spaced flutes on the exterior of the tubing. Such fluted tubing has been produced heretofore and is used for various constructions wherein the appearance of the tubing is important.

As disclosed herein, the method and apparatus receive the extruded tubing as it emerges from the extrusion press and onto the runout table and serve the dual purpose of moving and guiding the extrusions along the runout table, and at the same time imparting a rotary motion to the tubing so that a slight twist is imparted thereto which results in a spiral pattern of the longitudinally extending flutes on the extruded tubing.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
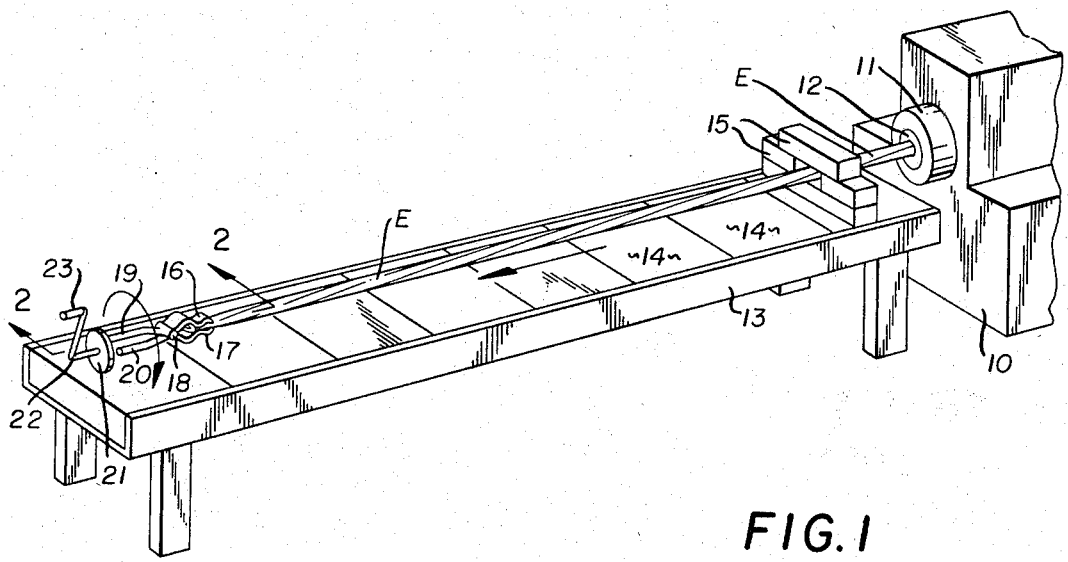
FIGURE 1 is a perspective view of a portion of an extrusion press and a runout table and showing the apparatus for rotating the extrusions produced by the press as the same is moved and guided along the runout table.

By referring to the drawings and FIGURE 1 in particular, it will be seen that an extrusion press has been symbolically illustrated and is generally indicated by the numeral 10. A die container on the extrusion press is indicated by the numeral 11, and an extrusion die by the numeral 12. An extrusion emerging from the die 12 is indicated by the letter E and it will be seen that, as customary in the extrusion art, it is delivered from the extrusion die 12 at a point above and adjacent to one end of a runout table 13. The runout table 13 includes a plurality of graphite blocks 14 which form the surface thereof and, as it will be understood by those skilled in the art, extends for a considerable distance away from the extrusion press so that a lengthy extrusion may be received thereon and guided therealong as customary in the art.

In FIGURE 1 of the drawings, a guide is positioned on the runout tables adjacent the extrusion press 10 and comprises a psurality of blocks of suitable material, such as graphite, and generally indicated by the numeral 15 and arranged so that they define a cross sectionally square opening through which the extrusion E is passed. The blocks 15 are secured to one another by any suitable means so as to positively position the pass opening through which the extrusion E is positioned in a desirable manner. This guide formed of the blocks 15 serves to align the extrusion E with respect to the extrusion die 12 and corrects any tendency of the extrusion to curve out of its desired axial path relative to the die 12 and the press 10.

As the extrusion is drawn along the runout table 13, the metal will cool and set, and the extrusion is drawn along the extrusion table by apparatus comprising comprising an extrusion gripping tongs having opposed clamping jaws 16 and 17, pivoted to one another by a transversely arranged pivot pin 18 and extending into spaced parallel handle portions 19 and 20, respectively.

It will occur to those skilled in the art that the extrusion gripping tongs including the jaws 16 and 17 and the handles 19 and 20 are arranged for manual operation, and that they are held by the workman guiding and pulling the extrusion E along the runout table 13. It will also occur to those skilled in the art that the configuration of the oppositely disposed jaws 16 and 17 is such that they crush the end of the tubular extrusion E as disclosed herein and thereby form a secure point of attachment thereto so that the extrusion is securely held thereby.

Figure 2:
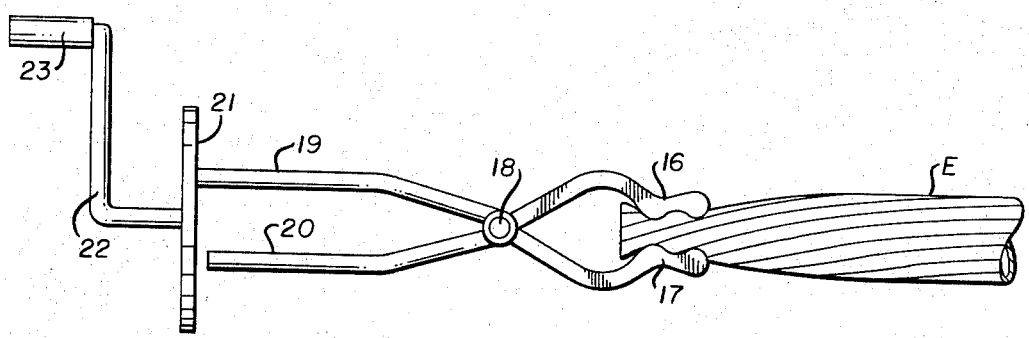
FIGURE 2 is an enlarged side elevation of the apparatus used for engaging and guiding the extrusion and imparting a rotary motion thereto.

By referring now to FIGURE 2 of the drawings, it will be seen that the handle 19 of the tongs is provided with a disc 21 and that the end of the handle 19 is secured to the disc 21 at a point offset from the center thereof and that the other side of the disc 21 has a centrally attached crank 22 including a hand-engaging handle portion 23. A workman first engaging the tong jaws 16 and 17 on the extrusion E and then moving away from the extrusion press 10 along the runout table 13 pulls the extrusion of the same rate of travel as its extrusion rate and holds the tong handles 19 and 20 in his right hand. Simultaneously, he employs his left hand to rotate the crank 22 thereby revolving the disc 21 and the tongs and the end of the extrusion E in a relatively slow rotary motion sufficient to impart a large spiral twist to the longitudinally extending flutes which are formed on the exterior of the extrusion E by the extrusion die 12 in the extrusion press 10. As the workman thus moves the extrusion along the runout table and simultaneously imparts the desired twist to the same to create spiral fluted effects, he performs the usual runout operation, and when the length of the extrusion equals that of the runout table, the extrusion is cut off with a torch, or other means, and moved to one side, and the operation is repeated on the next extrusion.

It will thus be observed that the extrusion die 12 in the press 10 is stationary and that the flutes appearing on the exterior surface of the tubular member being extruded are longitudinally thereof and that when the extrusion is rotated on its axis by the crank and tongs while the extruding end thereof is being held against rotation the desirable spiral fluting effect will be achieved, while at the same time the extruded tubing will be held relatively straight and be moved out on the runout table as is necessary.

The blocks forming the restricted guide opening through which the extrusion E initially passes help to initially align the extrusion longitudinally of the extrusion die and the extrusion press, and this necessary and desirable alignment is further insured by the workman guiding and moving the extrusion along the runout table while imparting the twisted motion thereto.

It will thus be seen that a method and an apparatus of making a spirally fluted extrusion has been disclosed, and it will occur to those skilled in the art that while the foam of the example of the extrusion chosen for illustration is tubular, the same method and apparatus may be advantageously employed in imparting twist effects or spiral effects to various extruded shapes, including tubes, bars, rods, channels, angles, etc.

It will thus be seen that the method and apparatus for forming spiral fluted extruded shapes meets the several objects of the invention, and having thus described my invention, what I claim is:

1. A method of forming a spiral fluted extruded shape which comprises extruding heated material through an extrusion die having an orifice configuration imparting a longitudinally extending fluted configuration to said extruded shape, engaging the leading end of said fluted extruded shape, moving said engaged end and extruded shape away from said extrusion die at a rate comparable with the extrusion rate through said die, rotating said extruded shape at its leading end on its longitudinal axis to cause said longitudinally extending configuration to cool and assume a spiral, allowing said extruded shape to solidify and stretching said extruded shape to straighten the same axially.

2. The method of decorating an extruded shape while the same is being extruded and in a heated plastic condition through a die having a configuration shaping the outer surfaces of said extruded shape, engaging said extruded shape and moving it away from said die at a rate comparable with said rate of extrusion, rotating the engaged part of the extruded shape to a degree necessary to twist the same axially, allowing the shape to cool and become rigid and stretching the cooled extruded twisted shape to straighten the same axially.

3. Apparatus for imparting an axial twist to an extrusion being extruded by an extrusion press, said apparatus comprising tongs having transverse jaws are engaging an end of said extrusion, said transverse jaws having crossed portions thereof pivoted to one another and extensions of said jaws beyond said pivot area defining spaced handles movable toward and away from one another arranged to open and close said jaws, means on one of said handles for rotating said tongs, said means comprising a crank, wherein a disc is positioned between said crank and one of said handles, said crank being secured to a central part of said disc and said handle being secured to the opposite side of said disc at a point in offcenter relation.

References Cited

UNITED STATES PATENTS

| | | | |
|---|---|---|---|
| Re. 24,783 | 2/1960 | Humphrey | 72—299 |
| 932,848 | 6/1909 | Johnson | 81—73 |
| 1,525,730 | 2/1925 | Gates | 72—64 |
| 2,881,517 | 4/1959 | Carpenter et al. | 72—64 X |
| 2,929,434 | 3/1960 | Barnes | 72—299 X |
| 946,631 | 1/1910 | Ballou | 72—77 |

CHARLES W. LANHAM, *Primary Examiner.*

E. SUTTON, *Assistant Examiner.*